Dec. 30, 1969 A. B. LEVINE 3,486,449

PROCESS OF REPULSION PRINTING EMPLOYING
A RADIANT ENERGY FIELD

Original Filed Aug. 23, 1963

INVENTOR
ALFRED B. LEVINE

BY Paris, Haskell & Levine

ATTORNEYS

United States Patent Office 3,486,449

Patented Dec. 30, 1969

3,486,449

PROCESS OF REPULSION PRINTING EMPLOYING A RADIANT ENERGY FIELD

Alfred B. Levine, 2924 Terrace Drive, Chevy Chase, Md. 20015

Continuation of application Ser. No. 304,176, Aug. 23, 1963. This application Aug. 26, 1966, Ser. No. 575,474

Int. Cl. B41c 3/08

U.S. Cl. 101—426 12 Claims

ABSTRACT OF THE DISCLOSURE

An electrical process for simultaneously printing one or more copies of an image from a master applied in the form of a pattern of electrical conductors, e.g. a printed circuit, a pattern of magnetized areas, or a pattern of electrostatic charged areas wherein the patterns are operated upon by a remote electrical or magnetic field creating a force pattern on a pressure sensitive marking medium to transfer dye or color markings onto one copy or plural copies simultaneously. The force pattern may be amplified or enhanced by applying a current directly to the pattern of conductors to electrodynamically react with the field.

Figure 1:
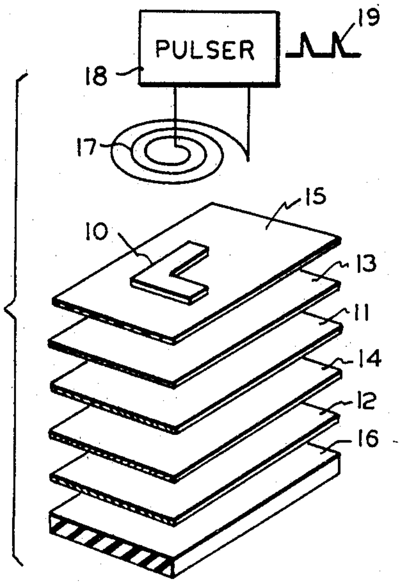

This application is a continuation application of Ser. No. 304,176, filed Aug. 23, 1963 (now abandoned).

This invention generally relates to printing, embossing, and reproducing of indicia and images by the use of electrical and magnetically produced forces reacting with pressure sensitive mediums, and pertains to methods for this purpose that are capable of making one copy or many copies simultaneously of the image or indicia.

Very generally according to the practice of the invention, there is provided a master image of the indicia or other data to be copied in the form of either a pattern of electrical conductors, a pattern of electrostatic charges, or a magnetic pattern, and this master image is disposed on a pressure sensitive recording medium, that in an elementary form maybe nothing more than a combined sheet of paper and a sheet of typewriter carbon paper. This master image is then subjected to an electric field or magnetic field in force reactive relationship with the pattern to create a selective pattern of forces bearing against the pressure sensitive medium. The pressure sensitive recording medium responds to the selective pattern of forces being produced to provide a permanent or impermanent marking in the form of a color marking, embossing or other on the recording medium corresponding to the original master image.

Since the master image being used may be in the form of an electrostatic pattern of charges or a magnetic pattern, the process lends itself to rapid reproduction or copying of data by enabling the master to be automatically formed by the known Xerographic copying process, as is typified by the Carlson patents, such as Patent No. 2,297,691, or by any of the known magnetic pattern producing processes. However, as will be recognized by those skilled in the art, the present invention basically differs from this prior art in the manner of reproducing this master image to provide a number of copies simultaneously or single copies individually by creating forces that react with pressure sensitive marking mediums.

For obtaining a number of reproductions of the original image, either simultaneously or in sequence, the pattern of forces being developed from the master image may be applied in sequence to a series of pressure sensitive marking mediums, or may be applied simultaneously to a group of such mediums that are disposed in a superposed or stacked relationship. In the latter case, the forces being developed from the master image are transmitted through the stack from each copy to the next, and the numerous reproductions of the image are made simultaneously. As an elementary example of this simultaneous copying process a series of thin sheets of common writing paper may be disposed in a stack that is interleaved with conventional typewriter carbon paper. A selective pattern of forces corresponding to the desired image is produced on the stack and reproduces the image on each sheet with the same result as does a typewriter except for the fact that the pattern of forces is created electrically or magnetically and not mechanically as by the keys of this typewriter, and except for the further fact that the complete image may be produced simultaneously on each sheet instead of having each character being produced in sequence on each sheet as by the typewriter keys.

According to another embodiment, there is provided an improved process for embossing an image on a recording member such as a sheet of paper for such purposes as reproducing or printing Braille information and pictures for use by the blind. This is obtained by initially creating a master image as before, but in Braille coding, and applying it to one or more sheets of preferably thin and deformable paper that is supported on a resilient base, such as a rubber platen. When this master pattern is subjected to an electric or magnetic field, a selective pattern of forces is created and transmitted against the paper, urging the paper against the resilient base to reproduce the image in the form of a rupture image or embossing on the paper. As is known to those skilled in the art, such images are read by the blind by utilizing the sense of touch for detecting the raised embossed, or perforated image.

It is accordingly a principal object of the invention to provide an improved manner of printing, reproducing, or embossing by applying electrically or magnetically produced forces in predetermined patterns.

A further object is to provide such printing or reproducing processes wherein the complete image or data is produced simultaneously on the record member.

A further object is to provide such processes where the printing or reproduction may be performed very rapidly.

A still further object of the invention is to provide such processes wherein duplicate copies of the image may be obtained simultaneously.

A still further object of the invention is to provide such processes for embossing or rupturing a recording medium in a desired pattern to record images.

A very general object of the invention is to provide a novel manner of printing and recording on pressure sensitive recording mediums by the use of electrically or magnetically created force patterns.

Figure 4:
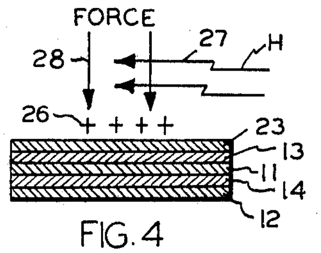
Figure 5:
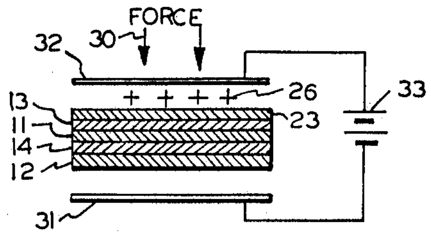
Figure 6:
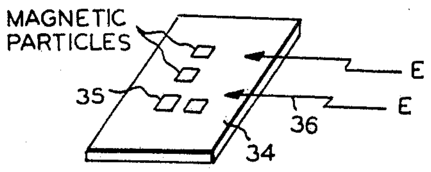
Figure 2:
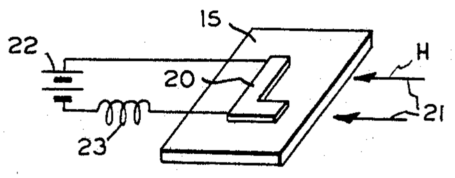
Figure 3:
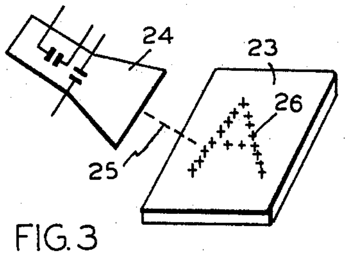

Other objects and many additional advantages will be more readily understood by those skilled in the art after a detailed consideration of the following specification taken with the accompanying drawings wherein:

FIG. 1 is a perspective view diagrammatically illustrating one manner of producing multiple copies of an image according to the present invention, FIG. 2 is a perspective view illustrating an alternative manner of employing a master pattern for reproduction, FIG. 3 is a diagrammatic view illustrating one manner of producing a master image having an electrostatic pattern of charges, FIG. 4 is a diagrammatic sectional view illustrating one manner of producing multiple copies of an image employing an electrostatically charged master pattern, FIG. 5 is a diagrammatic sectional view illustrating an alternative manner of producing multiple copies of an image employing an electrostatically charged master pattern, FIG. 6 is a perspective view illustrating a still further form of the master image employing a magnetic pattern.

Figure 7:
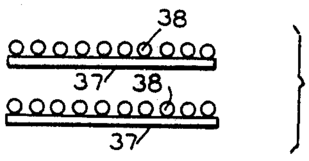
Figure 9:
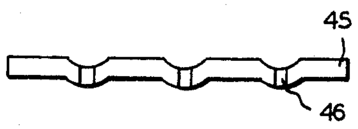
Figure 8:
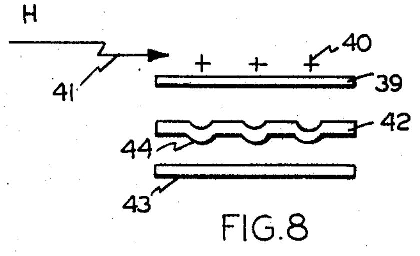

FIG. 7 is a diagrammatic sectional view illustrating an alternative pressure sensitive marking medium that may be employed in practicing the invention, FIG. 8 is a diagrammatic sectional view illustrating one manner of producing an embossed image according to the invention, and FIG. 9 is a diagrammatic sectional view illustrating a recording medium having a rupture or perforated image according to an alternative form of the invention.

Referring to the drawings for a detailed consideration of preferred manners of practicing the invention, there is diagrammatically shown in FIG. 1 one manner of simultaneously printing or reproducing multiple copies of a master image 10 on a plurality of sheets of copy paper 11 and 12 that employs electromagnetically produced forces. As shown, the series of sheets of copy paper 11 and 12 are disposed in a stack and interleaved with sheets of common duplicating or transfer paper 13 and 14, such as sheets of conventional typewriter carbon paper, and the complete stack is supported on a suitable platen 16, which may be a plate of hard rubber or the like.

Disposed above the stack of copy papers and transfer sheets is provided a master sheet 15 of thin, flexible nonconducting material, such as the plastic Mylar, supporting the desired pattern 10 to be reproduced in the form of a thin layer of metal or other highly electrically conductive material. It will be recognized by those skilled in the art, that the master may be a printed electrical circuit that is formed and attached to the flexible base sheet 15, and that may be fabricated by various of the well known printed circuit production techniques. Alternatively, a library of the desired patterns or images of electrical conductors 10 may be separately formed, such as by stamping out sheets of metal foil, and that these stamped pieces need not necessarily be attached to the flexible plastic sheet 15 but may be merely placed on the plastic sheet in the various patterns or images that it is desired to reproduce. In FIG. 1, the planar conductors are in the shape of the letter L, the two legs of which are conductors of this pattern.

Spaced above the master pattern 10 there is provided a flat spirally wound magnetic coil 17, that is connected to be energized by an electrical source 18 producing high current intensity pulses 19, which pulses generally have a sawtooth shape waveform, as shown, to provide rapid changes in magnetic flux. The coil 17 is closely spaced directly above the conducting pattern 10 of the master, and is, in effect, a power coil adapted to be energized by the large current pulses to produce an intense magnetic field in inductive relationship with the metal pattern 10 of the master.

For simultaneously printing or reproducing the image or pattern 10 on the sheets 11 and 12, the spiral coil 17 is pulsed as indicated above, and by electrical induction a large circulating current is produced in the conductor pattern 10 that operates in force reactive relationship with the magnetic field produced in coil 17. The power coil 17 is rigidly supported, and therefore this reaction force is transmitted downwardly against the stack of copy papers and transfer papers, and the pattern of forces being produced simultaneously actuates the transfer papers 13 and 14 to print or reproduce the master pattern 10 on both of the sheets of copy paper 11 and 12.

As is well known in the art of dynamoelectric machines, the force produced on the master pattern 10 is in proportion to the square of the current in coil 17, and consequently depending upon the number of copies to be made, the thickness of the papers, the type of copy papers and transfer papers used, and the degree of contrast desired as well as other parameters, the amplitude of current being produced by the pulser 18 is preferably made adjustable to vary the force produced on the master pattern as is desired.

As noted above, the waveform of the current pulses energizing the coil 17 are provided in a sawtooth type configuration to produce rapid changes in the magnetic flux and therefore to produce impact type forces on the stack of papers. This impact type force is desired to reproduce clear and sharply defined images on the copy papers 11 and 12. However, as will be appreciated by those skilled in the art, squarewave shaped pulses and other pulsed or nonpulsed waveforms of the pulses 19 may be employed. For each current pulse being produced by the pulser 18, there is generated a separate impact force on the stack of papers, and quite often it is preferred to produce a repetitive series of less intense impacts on the stack of papers than a single impact. However, a single intense impact produced by a large single pulse is desirable where the stack of sheets are supported in such fashion as to permit slight movement or displacement of the sheets during the repetitive pulsing.

It will be appreciated from the foregoing description, that the pattern of forces being produced is defined by the configuration of the electrical conductor pattern 10 on the master, and in view of the versatility of printed circuit processes, a substantially infinite number of different conductor patterns may be formed on the master to reproduce indicia in any language, code, or image desired.

FIG. 2 illustrates an alternative manner of producing the pattern of forces by an electrodynamic technique that in some instances may be preferred over the induction technique of FIG. 1 in requiring a less intense magnetic field 21. In this embodiment, the master to be reproduced is similar to that of FIG. 1, and employs a flexible base sheet 15 that is capable of transmitting the pattern of forces produced, and having a predetermined pattern of electrical conductors 20 supported thereon. However, in this case, electrical connections are made to the pattern 20 from a battery 22 or other power source, and an electrical current is passed through the pattern 20 to react in force reactive relationship with the magnetic field 21 produced by a winding such as coil 17 in FIG. 1, and indicated in the drawing as H thereby to electrodynamically create the desired pattern of forces. As will be recognized by those skilled in the art, in this embodiment the magnetic field 21 may be made constant and the electrical current passed through the conducting pattern 20 may be pulsed to react with this constant field (not shown). If on the other hand, a constant current is passed through the conductive pattern 20, and the magnetic field 21 is pulsed as described above in connection with FIG. 1, an inductance 23 is employed in the connections to the battery 22 to prevent any induced currents from passing through to the battery source 22.

In both embodiments described above, the pattern of forces being produced and determining the ultimate image formed on the copies is determined by a predetermined configuration of conductors on the master. FIG. 3 illustrates one manner of reproducing multiple copies of an image that does not require the initial making of a master pattern of conductors.

In FIG. 3, the image or pattern to be reproduced is formed by providing an electrostatically charged image 26 on a suitable flexible, dielectric base sheet 23 of plastic or the like. This electrostatic pattern of charges 26 corresponding to the desired image may be formed by any of the well known processes of xerography, such as is described in the above mentioned Carlson Patent 2,297,691, as well as in the other extensive literature on this subject. Alternatively, as is illustrated in FIG. 3, the desired electrostatic pattern 26 may be obtained by the use of a writing cathode ray tube 24 as is well known in the art and available on the open market, which is controlled to spray an electron beam 25 over the surface of the base sheet 23 in any desired configuration for the master image.

For simultaneously producing multiple copies of this master electrostatic image 26, two different developing processes may be used as is generally shown in FIG. 4 and FIG. 5.

In the embodiment of FIG. 4, the master sheet 23 bearing the electrostatic pattern 26 is disposed over the stack of interleaved copy and transfer sheets, and is subjected to a changing magnetic field 27 that is oriented at right angles to the pattern of charges 26. This changing magnetic field interacts in force reactive relationship with the electrostatic charges 26 to produce a downwardly operating pattern of forces 28 on the stack of papers, thereby converting the electrostatically charged image 26 into a like pattern of forces, and simultaneously produces multiple copies of this image on the copy sheets 11 and 12.

In FIG. 5, the master sheet 23 bearing the charged pattern 26 is also disposed on the stack of interleaved carbon and transfer sheets, and the corresponding pattern of forces is created by subjecting the charged pattern 26 to an electric field. As is illustrated, this may be performed by inserting the stack of papers and the master sheet 23 between a pair of parallel disposed plates 31 and 32 forming a large capacitor, and energizing these plates by an intense direct current source of potential 33 to produce a strong electrical field through the stack and master sheet 23. This electrical field interacts with the electrostatic charges 26 to generate a corresponding pattern of forces. In this embodiment, the direct current source 33 may be replaced by an intense pulsing source (not shown) such as is employed in FIG. 1, to produce an impact or a series of consecutive impacts on the stack of papers, as might be desired.

FIG. 6 illustrates a still different manner of producing a master image from which multiple copies may be made, and that does not require a base sheet 34 of dielectric material but may instead employ a base sheet of either conducting material or nonconducting material as described above. In this embodiment, the master pattern is formed by providing a series of discrete magnetized areas 35 on the base, such as in the form of premagnetized particles. A number of different processes for providing such a magnetic pattern are known in the art.

For developing this magnetic image 35, the master base 34 may be disposed above the stack of papers in the same manner as described above, and subjected to a magnetic field in force reactive relationship with the magnetized areas, or to a changing electric field 36, as is illustrated. As is well known, the magnetized areas will not interact with a static electric field, but will interact with a changing electric field in the same manner as does a magnet interact with current flowing through a conductor. The pattern of forces produced in the master is transmitted through the stack of papers and interacts with the pressure sensitive transfer sheets 13 and 14 in the same manner as described above to simultaneously reproduce the image on the copy sheets 11 and 12.

In all of the embodiments described above, the desired image is simultaneously printed or reproduced by applying the pattern of forces to a stack of copy sheets interleaved with separate pressure sensitive transfer sheets, such as conventional typewriter carbon paper, which respond to the pattern forces produced to print the image on the copy papers. However, as will be appreciated by those skilled in the art, a number of other pressure sensitive recording mediums are known and available on the open commercial market. In one such group of copy papers, the papers themselves incorporate their own pressure sensitive marking material so that separate transfer sheets are not required. For example, in one such group of copy papers, generally illustrated by FIG. 7, and sold on the open market by the National Cash Register Company, the copy papers 37 incorporate a color marking dye disposed within small globules 38 over the surface of the sheet or incorporated within the body of the paper. These globules 38 are small pressure sensitive containers and respond to forces by rupturing or breaking to release the color marking dye and indicate the areas on the copy paper where pressure has been applied. Pressure sensitive copy papers of this type are variously described in Patent No. 2,299,693.

Those skilled in the art will appreciate that these latter copy papers offer some advantages in not requiring separate sheets of transfer and copy papers. Many other pressure sensitive marking and printing papers and other pressure sensitive recording mediums are also known and available on the market, and it will be understood that the present invention is not to be considered as being limited to the use of any particular type of pressure sensitive recording medium.

FIG. 8 illustrates a still different manner of providing single or multiple copies of an image wherein the image is not formed as a marking or a color marking on the copy paper, but rather is formed as an embossing. Reproducing an image in the form of an embossing on a paper or other medium is desired for many applications, numbering among which is the reproducing of intelligence and designs in Braille for use by the blind. Referring to FIG. 8, the process employed is generally similar to that described above, and there is provided a master sheet 39 bearing the desired pattern thereon in the form of electrostatic charges 40, or electrical conductors, or a magnetic pattern, all as described above. This master is disposed above one or more sheets of copy paper 42, located in a stack and supported on a base sheet 43. However, in this case, the copy paper 42 or other recording medium is formed of a paper, cloth or the like, that is easily embossable and retains a permanent deformation. Most ordinary copy papers may be used for this purpose, providing that they are slightly wetted by water or other moistening medium so that they may be easily deformed, and will retain the deformation image when they are dry. Alternatively, various of the special type papers with low wet strength are also available which may be easily deformed by a selective pattern of forces and will retain the embossed image. The base member or platen 43 according to this embodiment, is preferably of a more resilient material such as foam rubber, sponge rubber, or other such more resilient base material, either natural or synthetic, than the harder rubber type platen 16 of FIG. 1, for example, such that the pattern forces being applied to the platen permit the platen 43 to selectively yield according to the desired pattern or image.

In operation, a series of deformable copy sheets 42 are disposed in a stack on the platen 43, and the master image bearing sheet 39 is energized by an electric field or magnetic field, as above described, to generate a corresponding pattern of forces. This pattern of forces is transmitted through the stack of deformable papers which selectively yields against the resilient base 43 and permits the papers to be embossed. Thus in the same general manner as described above, the master pattern or image is converted into a selective pattern of forces which in turn produces a corresponding embossing on a pressure sensitive embossable paper or other medium.

As a still further modification of the above, there is diagrammatically shown in FIG. 9 still another form of copy paper 45 that may be employed in which the paper or medium is such that it does not resiliently yield or deform but instead may be easily torn or perforated in response to the selected pattern of forces. Most ordinary copying papers if moistened or wetted with water or other wetting material and subjected to a sufficient deforming force will easily perforate, as generally indicated at positions 46 in FIG. 9, thereby to provide a selective pattern of apertures or openings in the paper according to the desired image.

As will be appreciated by those skilled in the art, in all of the varying processes described above, the master image is converted into a selective pattern of forces which in turn operates upon pressure sensitive recording mediums to effect a permanent or impermanent recording of the image. The forces being created are dynamoelectric, electrodynamic, electrostatic or various combinations thereof, all of which in turn are proportional to the electrical currents, fields, and strengths of the magnetic fields employed. Consequently, in all of these embodiments the intensity of the forces being produced may be adjusted by varying the intensity of the magnetic field or the electric field, according to the desired type and mode of printing, copying or embossing as might be desired.

Although but limited embodiments of the invention have been illustrated and described, it is believed evident that many variations may be made by those skilled in the art without departing from the spirit and scope of this invention. For example, for rendering the various copy papers and transfer papers more sensitive to the selective pattern of forces, these recording materials may be preheated or prestressed so that the abrupt application of small impact forces are sufficient to react with the pressure sensitive mediums and effect the recording either in the form of marking, color marking, embossing, or perforation as is desired. The processes may also be incorporated into more automated systems such as are employed in the fields of xerographic copying or reproduction by creating the electrostatic or magnetic patterns by the use of continuous selenium drums, optical scanning and other known techniques that serve the purpose of automatically producing the master by copying from a printed or otherwise marked original. Since these and many other changes may be made by those skilled in the art without departing from the spirit and scope of this invention, this invention is to be considered as being limited only by the following claims appended hereto.

I claim:

1. A method of repulsion impact printing employing a remotely produced radiant energy field that interacts in repelling relationship with a shaped pattern of an electrical conductor having the configuration desired to be printed, comprising the steps of: applying a pattern to be reproduced in a shaped configuration of a nonmagnetized electrical conductor to a pressure sensitive print releasing medium, producing a remote radiant energy field, subjecting the pattern to said field to produce a repelling force between the field and the pattern of such magnitude to convert the pattern into a force pattern exerted on the pressure print releasing material for printing.

2. A process for printing and reproducing an image on a pressure sensitive marking medium comprising: providing and supporting a character shaped electrical conductor against the medium, with the conductor in the shape of the desired image, subjecting the conductor to a magnetic field, and applying electrical current to the conductor to react with the magnetic field and produce a pattern of forces against the medium in the shape of the desired image.

3. In the process of claim 2, the step of simultaneously producing multiple copies of said image comprising superposing a series of said marking mediums whereby said pattern of forces is applied simultaneously through the superposed medium to develop the forces against each medium.

4. A process for printing images by transfer of a marking substance from a layer of pressure sensitive print releasing material onto a layer of print receiving material comprising: providing a thin layer of substantially nonmagnetic electrical conductors in a character shaped two dimensional configuration corresponding to the complete image to be printed, disposing said layer of electrical conductors and said layer of print releasing material and print receiving material adjacent one another in stacked relationship, and subjecting said layer of electrical conductors to a magnetic field in force reactive relationship to the conductors to induce a current flow in said electrical conductors that reacts in opposition to the magnetic field to produce a two dimensional force pattern in the shape of the desired image against the print releasing material.

5. In the process of claim 4, said thin layer of electrical conductors being supported on a flexible support layer disposed against said layer of print releasing material and print receiving material.

6. In the process of claim 4, simultaneously printing multiple copies of said image by superposing a series of said print receiving layers interleaved with layers of print releasing material.

7. A process for printing and reproducing an image against a pressure sensitive marking medium comprising: providing a character shaped electrical conductor in the shape of the desired image on a flexible master, supporting the master adjacent the pressure sensitive marking medium, and subjecting the master to a magnetic field in force reactive relation to the conductor to produce a pattern of forces in the shape of the conductor against the marking medium, and applying an electrical current to the conductor to electrodynamically react with the field.

8. A process for printing images by transfer of a marking substance from a pressure sensitive marking material onto a layer of print receiving material comprising: providing a thin planar overlayer of substantially nonmagnetic electrical conductors preconfigured in an extended two dimensioned pattern configuration corresponding to a complete image portion to be printed, disposing said overlayer of electrical conductors adjacent said print receiving layer and said pressure sensitive print releasing material, subjecting said overlayer of electrical conductors to a magnetic field in force reactive relationship to generate by induction a current flow in said conductors reacting in opposition to its producing magnetic field to repell the conductors away from the magnetic field and the conductors to produce a corresponding two dimensioned force pattern in the shape of the desired image portion against the print releasing material thereby to release print in the same image onto the layer of print receiving material.

9. In the process of claim 8, the forming of said overlayer of electrical conductors in one of an alpha-numeric-pictorial configuration supported on a flexible layer, and applying said flexible layer over said print releasing material and print receiving layer.

10. In the process of claim 8, the forming of said overlayer of electrical conductors as a printed electrical circuit onto a flexible support layer, and disposing said support layer over said print receiving layer and print releasing material.

11. A magnetic induction process for printing an image comprising the steps of: disposing an electrically conductive nonmagnetic marking element proximate a pressure sensitive color producing medium, subjecting said element to a changing magnetic field to induce a current flow in said element and create a corresponding repulsion force between the element and the magnetic field, and arranging the orientation of the field with respect to the element so that the repulsion force operating on said element creates a pressure between said element and said medium to provide a color marking corresponding to the shape of said element.

12. A method of impact printing by magnetic induction comprising disposing a marking element having electrically conductive nonmagnetic material proximate a medium to receive a marking, subjecting said element to a varying magnetic field to create a current flow resulting in a repulsion force between the element and magnetic field and orienting said magnetic field direction such that the repulsion force impacts the element with the medium.

(References on following page)

References Cited

UNITED STATES PATENTS

| | | | |
|---|---|---|---|
| 2,785,039 | 3/1957 | Artzt | 346—77 X |
| 3,016,308 | 1/1962 | Macoulay | 252—316 X |
| 3,020,171 | 2/1962 | Bakan et al. | 252—316 X |
| 3,131,019 | 4/1964 | D'Antonio | 346—77 |
| 3,149,901 | 9/1964 | Hagelbarger | 346—77 |
| 3,160,091 | 12/1964 | Schwertz | 101—426 X |
| 3,171,106 | 2/1965 | Lemmond | 178—6.6 |
| 3,182,591 | 5/1965 | Carlson | 101—426 X |
| 3,221,315 | 11/1965 | Brown et al. | 346—135 X |
| 3,144,650 | 8/1964 | Levine | 340—173 |

WILLIAM B. PENN, Primary Examiner

U.S. Cl. X.R.

117—1; 318—175; 336—177; 346—77